United States Patent [19]
Takahashi et al.

[11] Patent Number: 5,859,834
[45] Date of Patent: *Jan. 12, 1999

[54] OPTICAL DISC WITH MAGNETIC MEMBER IN A RECESSED PORTION THEREOF AND METHOD FOR PRODUCING SAID OPTICAL DISC

[75] Inventors: Kenji Takahashi, Miyagi; Katsuaki Tsurushima; Tadao Yoshida, both of Kanagawa; Kazuhiko Fujiie, Tokyo; Hirotoshi Fujisawa, Tokyo; Hiroshi Mukawa, Tokyo, all of Japan

[73] Assignee: Sony Corporation, Tokyo, Japan

[*] Notice: The portion of the term of this patent subsequent to Jun. 21, 2011, has been disclaimed.

[21] Appl. No.: 203,694

[22] Filed: Feb. 28, 1994

Related U.S. Application Data

[63] Continuation of Ser. No. 886,026, May 19, 1992, abandoned.

[30] Foreign Application Priority Data

May 29, 1991 [JP] Japan ................................. 3-154052
Jul. 17, 1991 [JP] Japan ................................. 3-214104

[51] Int. Cl.$^6$ ................................................. G11B 23/00
[52] U.S. Cl. ................................................... 369/290
[58] Field of Search ............................ 369/270, 282, 369/290, 291, 271, 289, 292; 360/99.05, 133

[56] References Cited

U.S. PATENT DOCUMENTS

| | | | |
|---|---|---|---|
| 4,687,536 | 8/1987 | Hiramatsu et al. | 156/556 |
| 4,787,009 | 11/1988 | Takahashi | 369/282 |
| 4,797,764 | 1/1989 | Doering | 360/135 |
| 4,827,468 | 5/1989 | Odawara et al. | 369/290 |
| 4,903,224 | 2/1990 | Namiki et al. | 369/290 |
| 4,944,982 | 7/1990 | Kikuchi | 428/64 |
| 4,981,538 | 1/1991 | Kikuchi | 156/73.1 |
| 5,115,961 | 5/1992 | Nakajima | 156/73.1 |
| 5,323,381 | 6/1994 | Takahashi et al. | 369/270 |

FOREIGN PATENT DOCUMENTS

| | | | |
|---|---|---|---|
| 0133541 | 2/1985 | European Pat. Off. | 360/133 |
| 3702189 | 1/1987 | Germany . | |
| 60-11147 | 3/1985 | Japan . | |
| 63-56889 | 3/1988 | Japan | 360/135 A |
| 5-28539 | 2/1993 | Japan . | |

Primary Examiner—Jefferson Evans
Attorney, Agent, or Firm—Limbach & Limbach L.L.P.

[57] ABSTRACT

An optical disc includes a disc base plate of a light-transmitting synthetic material having a recess for mounting a magnetic plate, and a holding part, integral with the disc base plate, for loosely holding the magnetic plate mounted in the recess with respect to the disc base plate. It is possible with the present optical disc to prevent distortion of the disc base plate otherwise caused by the difference in thermal expansion coefficients of the two components to inhibit double refraction of the disc base plate otherwise caused by such distortion to maintain good recording/reproducing characteristics.

11 Claims, 5 Drawing Sheets

OPTICAL DISC WITH MAGNETIC MEMBER IN A RECESSED PORTION THEREOF AND METHOD FOR PRODUCING SAID OPTICAL DISC

This is a continuation of application Ser. No. 07/886,026 filed on May 19, 1992, now abandoned.

BACKGROUND OF THE INVENTION

1. Field of the Invention

This invention relates to a disc for recording information signals, such as an optical disc or a magneto-optical disc, referred to hereinafter as an optical disc, and a method for producing the same.

2. Description of the Related Art

There has hitherto been proposed a disc for recording information signals, such as an optical disc or a magneto-optical disc.

With such disc, information signals can be recorded to a higher density, and hence a disc of an extremely small size has been proposed. For example, a small-sized magneto-optical disc 64 mm or less in diameter has been proposed.

The magneto-optical disc, which is small-sized and capable of recording to a higher density, is loaded on a disc rotating and driving device for being rotated at a higher velocity. While the disc is rotated at a higher velocity, a light beam radiated from an optical pickup is directed to a recording track provided on a signal recording layer formed on a major surface of the disc, while an external magnetic field is applied by the magnetic head for recording desired information signals on the disc.

For accurately radiating the light beam on the recording track of the magneto-optical disc rotated at an elevated velocity, it is necessary for the disc to be positively unified with a disc table of the disc rotating and driving device and to be positioned and loaded highly accurately with respect to the disc table.

Meanwhile, for positively unifying the magneto-optical disc to the disc table and loading the disc accurately with respect to the disc table, a disc loading system has been proposed in e.g. U.S. Pat. Nos. 4,787,009 and 4,829,510, according to which, with the magneto-optical disc set on the disc table, a chucking magnetic plate of e.g. a magnetic metal material, placed at the center of the magneto-optical disc, is magnetically attracted by a permanent magnet provided on the disc table, for loading the magneto-optical disc on the disc table.

Figure 1:
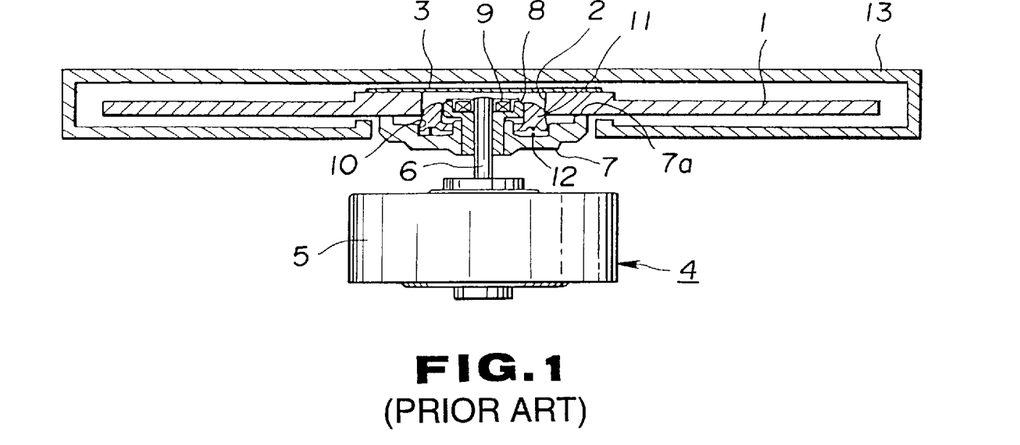
FIG. 1 is a cross-sectional view showing the state in which a conventional magneto-optical disc is loaded on a disc table of a disc rotating and driving device.

With the magneto-optical disc 1, employed in the disc loading system taking advantage of the magnetic attraction by the permanent magnet, a metal plate 3 as a magnetic plate is placed for closing a center opening 2 formed in the disc 1, as shown in FIG. 1. A disc rotating and driving device 4 for rotationally driving the magneto-optical disc 1 includes a spindle motor 5 having a rotary shaft 6 integrally carrying a disc table 7 and a permanent magnet 9 integrally mounted on the distal end of the rotary shaft 6 by means of a magnet holder 8. A centering member 11 is mounted at the center of the disc table 7 by being housed within a housing recess 10 formed at the center of the disc table, and is biased by a coil spring 12 for being moved axially of the rotary shaft 6.

Referring to FIG. 1, the magneto-optical disc 1 is set on the disc table 7, with the centering member 11 engaged in the center opening 2 with the rim of the centering hole 2 being supported by the disc table 7. The magneto-optical disc 1 is loaded as one with the disc table 7 by the metal plate 3 being magnetically attracted by the magnet 9. When set and loaded on the disc table 7, the magneto-optical disc 1 has its center of rotation aligned with the axis of the rotary shaft 6 by the centering member 11 which is introduced into engagement with the centering opening 2 while being moved axially of the rotary shaft 6.

By thus attracting the metal plate 3 on the magneto-optical disc 1 by the magnet 9 of the disc table 7, and centering the disc by the centering member 11, when setting the magneto-optical disc 1 on the disc table 7, the disc 1 may be loaded on the disc table 7 as one with and with highly accurate positioning relative to the disc table 7. On the other hand, the chucking mechanism of positioning and integrally loading the magneto-optical disc 1 on the disc table may be simplified in structure.

Meanwhile, the magneto-optical disc 1, which is of a reduced diameter and permits of high density recording of information signals, is housed in the disc cartridge 13, and loaded in this state on the disc rotating and driving device 4.

Meanwhile, the previously proposed metal plate mounted on the magneto-optical disc is bonded to a base plate or substrate of the magneto-optical disc, formed of a synthetic resin, such as a transparent polycarbonate resin, with the aid of a UV curable adhesive or a double-sided adhesive tape, in a manner free from positional deviation on the disc substrate.

However, since the thermal expansion coefficient of the metal plate differs markedly from that of the disc base plate formed of synthetic resin, if the metal plate is joined to the disc base plate with the aid of the above-mentioned adhesive, the metal plate may be peeled off from the disc base plate on repeated expansion and contraction of the metal plate and the disc base plate due to changes in ambient temperatures. On the other hand, if the metal plate and the disc base plate are secured strongly to each other in a manner free from peeling on repeated expansion and contraction, distortion may be produced in the disc base plate with changes in the ambient temperature, so that double refraction is produced within the disc base plate and hence information signals cannot be recorded or reproduced with good recording/reproducing properties on or from the signal recording layer formed on the surface of the disc base plate.

Above all, if the metal plate is bonded to the disc base plate with the aid of a UV curable adhesive, the risk is extremely high that double refraction be produced within the disc base plate during curing of the adhesive. If the UV curable adhesive is employed, it becomes difficult to improve the productivity of the magneto-optical disc because of the curing time involved in curing the adhesive.

On the other hand, since the double-sided adhesive tape is lacking in bonding strength, sufficient reliability in the bonding between the metal plate and the disc base plate cannot be assured with the use of such adhesive tape.

OBJECTS AND SUMMARY OF THE INVENTION

It is therefore an object of the present invention to provide an optical disc for recording information signals in which a chucking magnetic plate may be mounted on the disc base plate without employing an adhesive, such as a UV curable type adhesive.

It is another object of the present invention to provide an optical disc for recording information signals in which double refraction is not produced in the disc base plate to assure optimum recording and/or reproducing properties.

It is a further object of the present invention to provide an optical disc for recording information signals in which the magnetic plate may be mounted easily on the disc base plate to assure improved productivity.

It is a further object of the present invention to provide an optical disc for recording information signals in which the magnetic plate may be mounted easily on the disc base plate to assure improved productivity.

It is yet another object of the present invention to provide a method for producing such optical disc for recording information signals.

The present invention provides an optical disc comprising a magnetic plate, a disc base plate formed of a light-transmitting synthetic resin material, said disc base plate having a recess for accommodating said magnetic plate, and means for holding said magnetic plate accommodated in said recess between the magnetic member and the disc base plate with a predetermined gap therebetween, said holding means being formed integrally with said disc base plate.

For holding the magnetic plate within the recess of the disc base plate, the end part of the upright wall formed around the rim of the recess is thermally deformed for forming a projecting part projected into the inside of the recess for preventing the magnetic plate from being detached from the recess of the magnetic plate.

Other objects and advantages of the present invention will become apparent from the following description.

DETAILED DESCRIPTION OF THE PREFERRED EMBODIMENTS

Referring to the drawings, an illustrative embodiment of a disc for recording information signals according to the present invention is explained.

Figure 2:
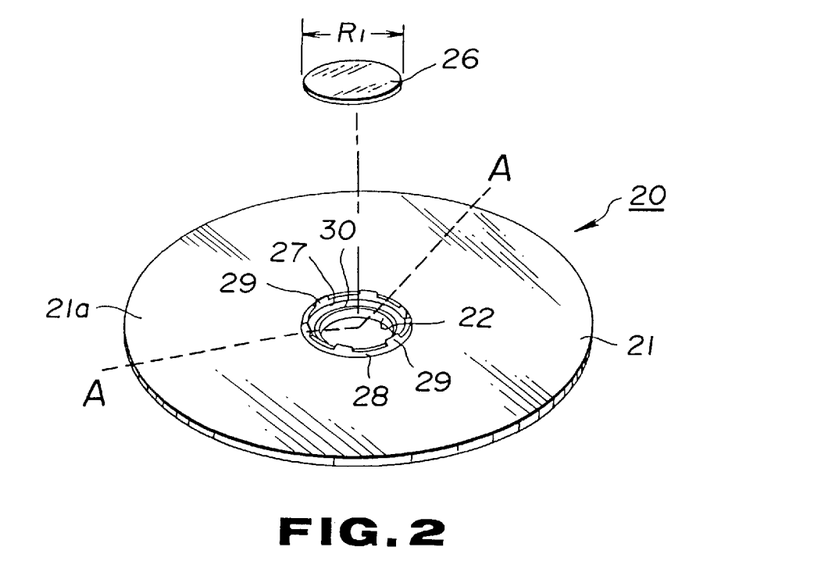
FIG. 2 is an exploded perspective view showing a magnetooptical disc according to a first embodiment of the present invention.

In the present embodiment, the present invention is applied to a magneto-optical disc 20 which, as shown in FIG. 2, is provided with a disk-shaped disc base plate 21 produced by molding a light-transmitting synthetic resin, such as polycarbonate resin. A recording layer for recording information signals is deposited on one major surface 21a of the disc base plate 21. The information signals are recorded and reproduced by radiating a light beam on the signal recording surface from a signal write-read surface which is formed on the other major surface 21b of the disc base plate 21 opposite to the major surface 21a.

Figure 3:
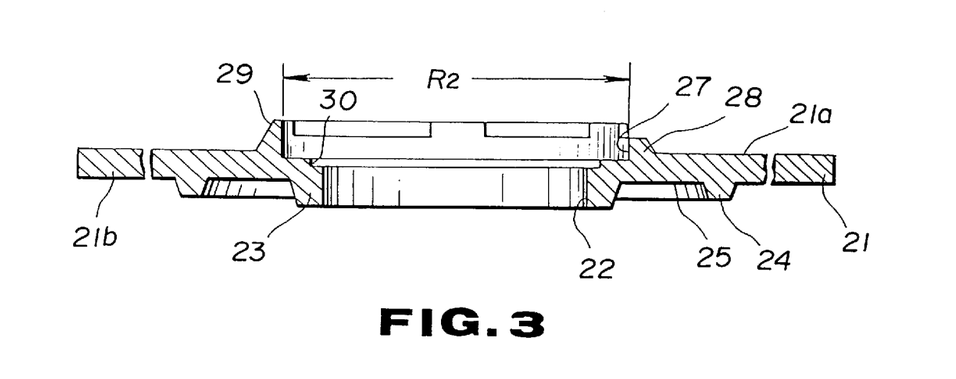
FIG. 3 is an enlarged cross-sectional view, taken along line A—A of FIG. 2, showing a disc base plate of a magneto-optical disc according to the first embodiment of the present invention.

Referring to FIGS. 2 and 3, a centering hole 22 engaged by a centering member 11 provided at the center of a disc table 7 of the above-mentioned disc rotating and driving device 4 is formed at the center of the disc base plate 21. Referring to FIG. 3, a raised cylindrical engaging rim 23 is formed around the centering hole 22 on the major surface 21b of the disc base plate 21. The engaging rim 23 is provided for increasing the thickness of the centering hole 22 formed in the disc base plate 21 for assuring a sufficient engaging length of the centering member 11 engaged in the centering hole 22.

On the major surface 21b of the disc base plate 21, a position-regulating annular protuberance 24, engaged with a regulating projection around a disc table inserting opening in the disc cartridge on insertion of the magneto-optical disc 20 into the disc cartridge for regulating the housing position of the magneto-optical disc 20 in the disc cartridge, is provided for surrounding the engaging rim 23, as shown in FIG. 3. A region surrounded between the engaging rim 23 and the position-regulating protuberance 24 presents a planar surface playing the part of a setting reference surface 25 supported by the disc table 7 when the magneto-optical disc 21 is set on the disc table 7.

At a mid part of the major surface 21a of the disc base plate 21, substantially in register with the centering opening 22, there is formed a recess 27 for overlying the centering opening 22. Within this recess 27, there is accommodated a metallic plate 26 which is formed of a magnetic metal material so as to be magnetically attracted by a permanent magnet 9 provided on the disc table 7. The recess 27 is of a diameter $R_2$ which is slightly larger than the outside diameter $R_1$ of the metal plate 26 so that a small gap is produced between the periphery of the recess and the metal plate 26 when the metal plate 26 is housed within the recess 27.

An annular projecting rim 28 is formed around the recess 27 for assuring a depth of the recess sufficient to accommodate the metal plate 26 of a predetermined thickness within the recess 27. A number of ribs 29 are formed for being projected from the end surface of the rim 28 for holding the metal plate 26 within the recess 27. In the present embodiment, six ribs 29 are formed at equal angular intervals, as shown in FIG. 2.

A step 30 is formed on the inner periphery on the bottom side of the recess 27. The step 30 acts as a clearance for severing a runner produced on injection molding the disc base plate 21. That is, by provision of the step 30, the centering opening 22 or the recess 27 is not affected in molding accuracy during severing of the runner.

Figure 4:
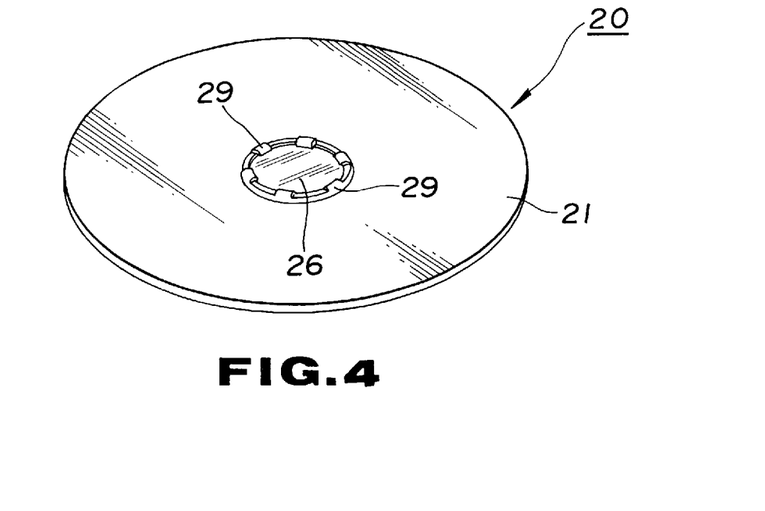
FIG. 4 is a perspective view showing a magneto-optical disc with a metal plate affixed to the disc base plate.
Figure 5:
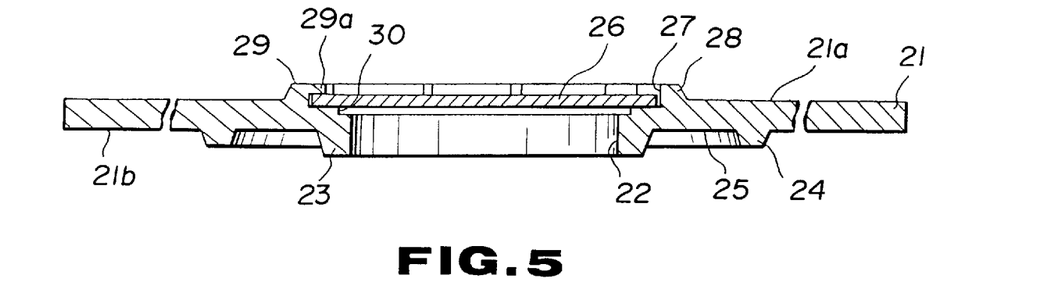
FIG. 5 is an enlarged cross-sectional view showing a magneto-optical disc with a metal plate affixed to the disc base plate.

On application of ultrasonic waves, such as with ultrasonic honing, the ribs 29 are crushed towards the inside of the recess 27 to form end parts 29a which are caulked against the rim of the metal plate 26 housed within the recess 27, as shown in FIGS. 4 and 5, for holding the metal plate 26 within the recess 27.

Meanwhile, the caulking of the rib 29 may also be made by heating using a heating trowel instead of by heating by ultrasonic waves. That is, any method may be employed for thermally caulking the ends of the ribs 29.

Figure 6:
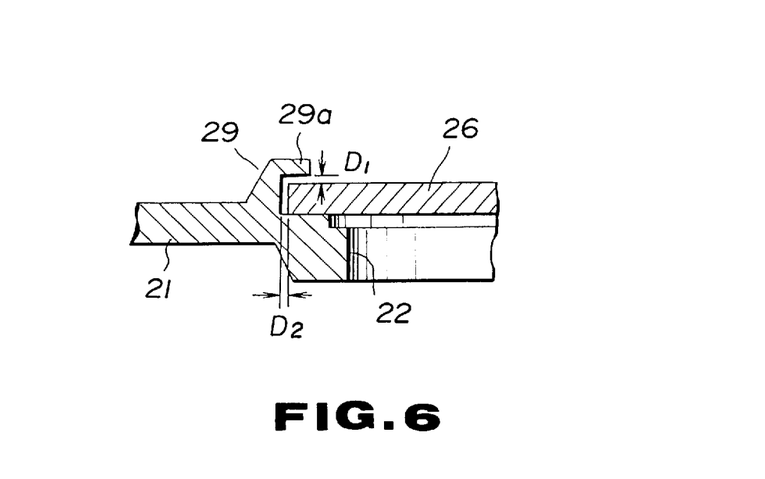
FIG. 6 is an enlarged partial cross-sectional view showing a magneto-optical disc with a metal plate affixed to the disc base plate.

It is noted that the ribs 29 are crushed by ultrasonic heating so that the ends 29a of the ribs are not pressed against the metal plate 26 accommodated within the recess 27. That is, the ribs 29 are crushed so that a small gap $D_1$ as shown in FIG. 6 is produced between the metal plate 26 and the ends 29a of the ribs 29 caulking the metal plate 26.

Since the recess 27 has the diameter $R_2$ slightly larger than the outside diameter $R_1$ accommodated therein, as mentioned above, the metal plate 26 is loosely maintained within the recess 27 with the small gaps $D_1$ and $D_2$ along the thickness and the diameter thereof, respectively. The result is that, even although the disc base plate 21 and the metal plate 26 should undergo expansion and contraction in a repeated manner with changes in the ambient temperatures, any differential expansion or contraction caused by the difference in the thermal expansion coefficients may be absorbed by the gaps $D_1$ and $D_2$ without affecting each other to prevent distortions from being produced in the disc base plate 21, so that double diffraction is not produced in the disc base plate 21.

The magneto-optical disc 20, with the metal plate 26 mounted on the disc base plate 21, as described hereinabove, is housed within the disc cartridge, similarly to the conventional magneto-optical disc 1, and is loaded in this state on the disc table 7 of the disc rotating and driving device 4.

Figure 7:
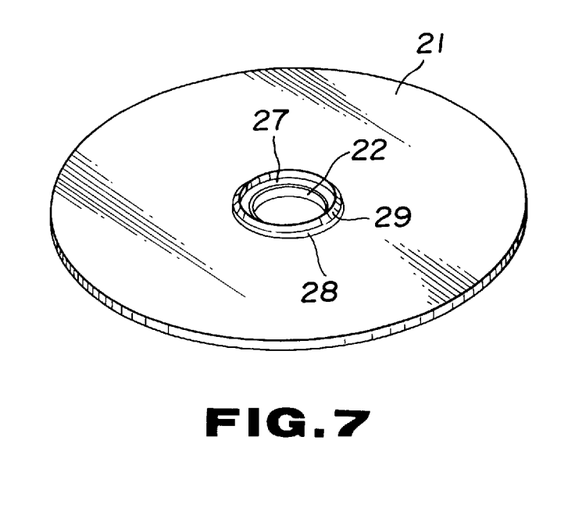
FIG. 7 is a perspective view showing another embodiment of a disc base plate of the disc according to the first embodiment of the present invention.

Although a number of ribs are provided in the above embodiment for caulking and holding the metal plate 26 within the recess 27, an annular rib in the form of a continuous annular ring may also be provided around the recess 27, as shown in FIG. 7. The distal end of the annular rib 29 may be crushed to form a crushed end for holding the metal plate 26 accommodated within the recess 27.

In the above-described first embodiment of the present invention, the rib 29 is provided on the disc base plate 21 and thermally caulked for holding the metal plate 26 against the disc base plate 26. However, in this case, the metal mold used for producing the disc base plate 21 tends to be complicated due to provision of the rib 29 on the disc base plate 21.

A second embodiment of a disc for recording information signals, designed to overcome this inconvenience, is hereinafter explained.

It is noted that the disc for recording information signals according to the present second embodiment is again a magneto-optical disc, as in the preceding embodiment.

Figure 8:
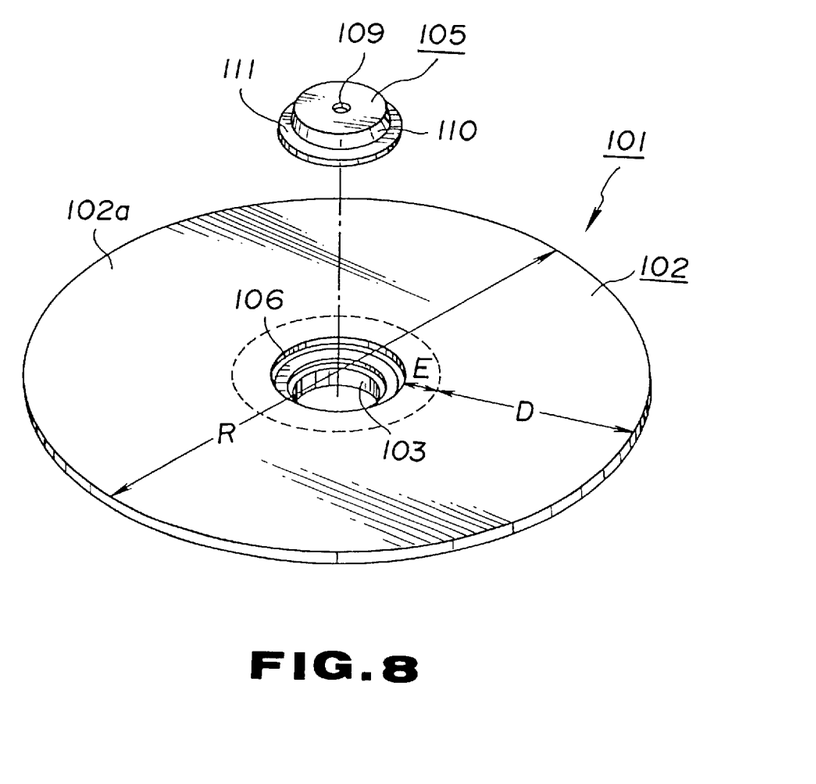
FIG. 8 is an exploded perspective view showing a magneto-optical disc according to a second embodiment of the present invention.

Referring to FIG. 8, a magneto-optical disc 101 according to the present second embodiment is provided with a disk-shaped disc base plate 102 produced by molding a light-transmitting synthetic resin, such as polycarbonate resin. A recording layer for recording information signals is deposited on one major surface 102a of the disc base plate 102. With the magneto-optical disc 101, produced by using the disc base plate 102, information signals are recorded and reproduced by radiating a light beam on the signal recording surface from the side of a signal write-read surface which is formed on the other major surface 102b of the disc base plate 102 opposite to the major surface 102a.

The disc base plate 102, constituting the small-sized magneto-optical disc 101 having a diameter R equal to 64 mm, has a thickness t equal to 1.2 mm. The radially outer region of the magneto-optical disc 101, excluding the radially inner region having the diameter equal to 32 mm, is a signal recording region D for recording information signals.

The disc base plate 102 has a center opening 103 engaged by a centering member 11 provided on a disc table 7 of a disc rotating and driving device 4, arranged as described previously. The center opening 103 is formed through the disc base plate 102 and has its center concentric with the center of curvature of a recording track(s) formed concentrically or spirally on the signal recording layer.

An annular projecting rim 104 is formed around the center opening 103 on the other major surface 102b of the disc base plate 102 within a non-recording region E other than the signal recording region D. The annular rim 104 plays the role of increasing the depth of the centering opening 103 formed in the thin disc base plate 102 to allow to increase the amount of projection of the centering member 11 of the disc 7 into the centering opening 103. That is, the annular projecting rim 104 makes it possible to increase the height of the centering member 11 engaged with the centering opening 103. In this manner, the amount of relative movement between the magneto-optical disc 101 mounted on the disc table 7 and the centering member 11 on loading the magneto-optical disc 101 on the disc table 7 is increased to assure a reliable centering operation of aligning the center of rotation of the magneto-optical disc 101 with the center of axis of the disc table 7.

The projecting annular rim 104 has substantially the same height of projection h as the thickness t of the disc base plate 101 and has its planar surface as a loading reference surface 104a of loading the magneto-optical disc on the disc setting surface 7a of the disc table 7.

An annular recess 106 for accommodating a magnetic metal plate 105 is formed on the major surface 102a of the disc base plate 102 for substantially overlying the centering opening 103. The annular recess 106 is of a diameter lesser than the outside diameter r of the projecting annular rim 104 and of a depth substantially equal to the thickness t of the disc base plate 102.

By forming the annular recess 106 of substantially the same depth as the thickness t of the disc base plate 102 substantially in alignment with the projecting annular rim 104, the projecting annular rim 104, having substantially the same height of projection h as the thickness t of the disc base plate 102, has a thickness w equal to the thickness t of the disc base plate 102, more precisely, the thickness of the signal recording region D of the disc base plate.

Meanwhile, the inner rim of the bottom of a setting surface 107 of the annular recess 106 for the metal plate 105 is formed with a step 108. The function of the step 108 is to prevent burrs or the like from being produced on the setting surface 107 for the metal plate 105 for maintaining the planar setting surface 107.

The metal plate 105, accommodated in the recess 106, is formed by a disk-shaped thin magnetic metal sheet of e.g. a stainless steel plate SUS-430, with a thickness of the order of 0.4 mm, for facilitating machining and for not increasing the weight of the magneto-optical disc 101.

Referring to FIG. 8, the metal plate 105 is formed in a disk shape of a size that can be accommodated within the annular recess 106. The metal plate 105 is provided with a centering hole 109 by means of which the metal plate 105 may be accommodated in the recess 106 with the center of the metal plate 105 in alignment with the center of the disc base plate 102. The positioning hole 109 may also be used for receiving a jig used for holding the metal plate 105 when introducing the metal plate 105 into the annular recess 106.

Meanwhile, if the metal plate 105 is simply formed as a planar disk, the center opening 103 formed at the center of the annular recess 106 is of a shallow depth when the metal plate 105 having a depth approximately equal to the thickness t of the disc base plate 102 is accommodated in the recess 106.

Thus the metal plate 105 has an upright bent outer peripheral section 110 which is of a height such that the central major surface section 105a thereof is flush with the major surface 102a of the disc base plate 102 when the metal plate 105 is accommodated within the recess 106. An annular setting rim 111 for setting the metal plate 105 in the annular recess 106 is formed radially outwardly of the upright outer peripheral section 110 in parallel with the major surface 105a. That is, the metal plate 105 is in the form of a disk raised except the rim portion, as shown in FIG. 8.

The upright section 110 may also be formed by embossing or machining a metal material of an increased thickness, instead of by bending.

Figure 9:
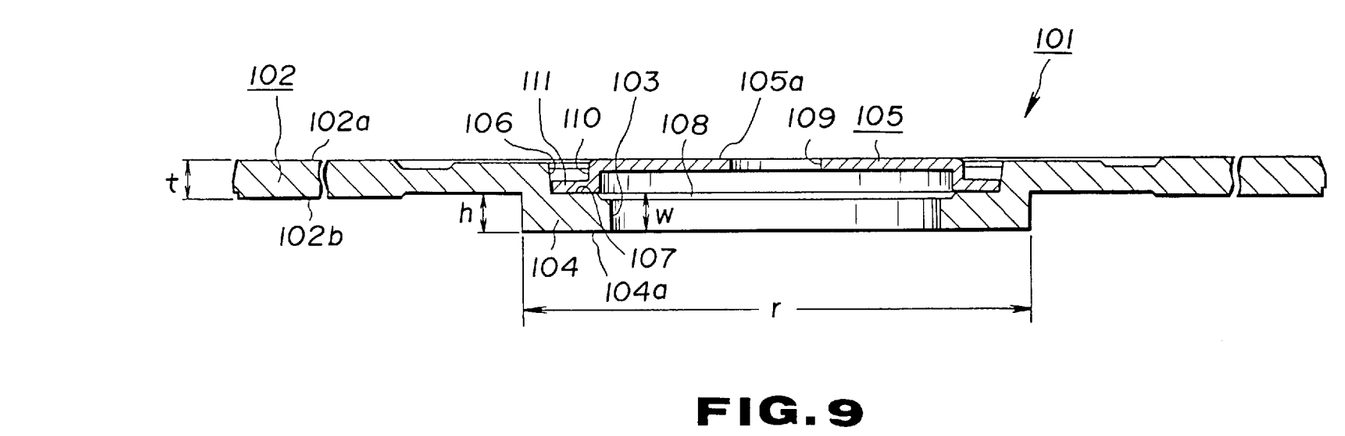
FIG. 9 is an enlarged partial cross-sectional view of the magneto-optical disc shown in FIG. 8.
Figure 10:
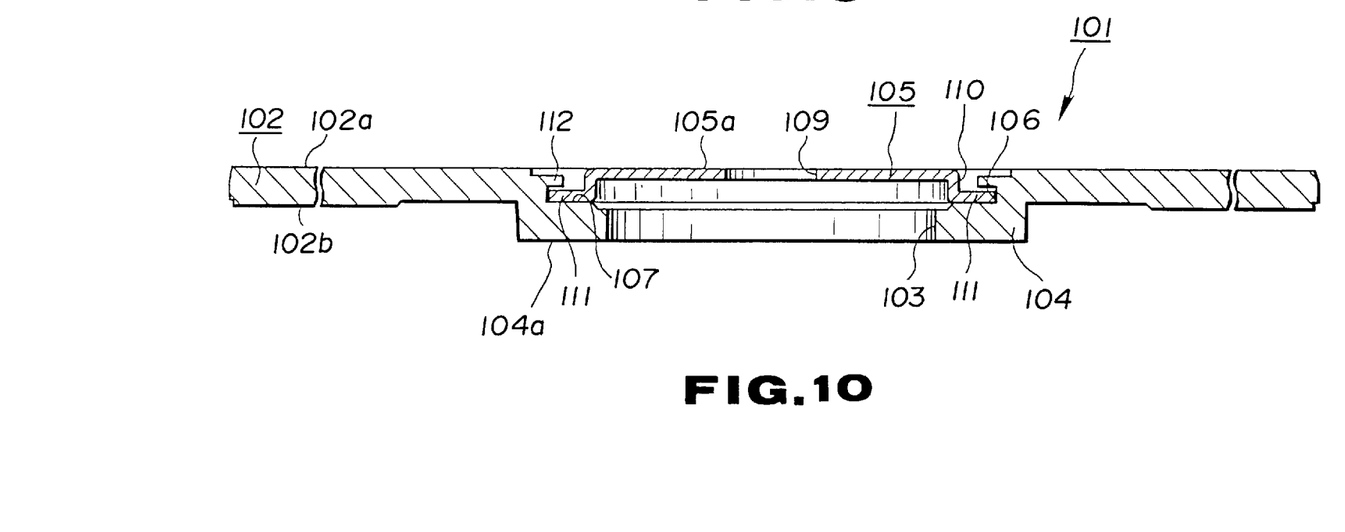
FIG. 10 is an enlarged partial cross-sectional view showing the state in which a metal plate is attached to a disc base plate of the magneto-optical disc according to the second embodiment of the present invention.
Figure 11:
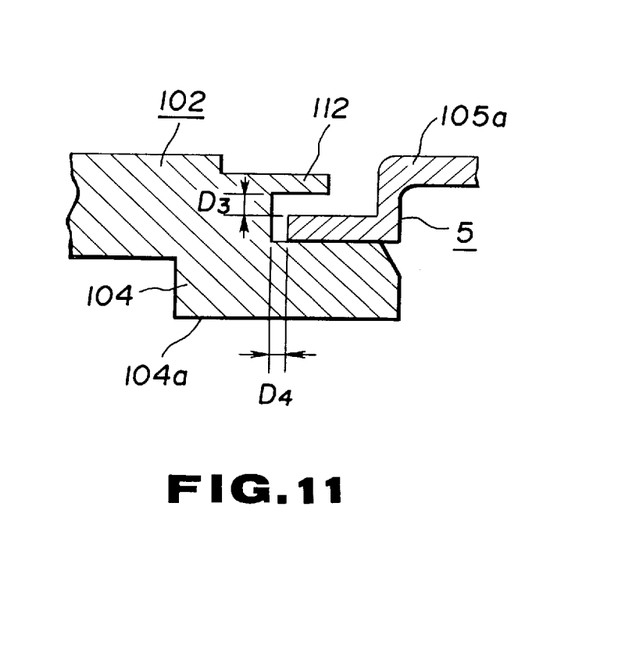
FIG. 11 is an enlarged partial cross-sectional view showing essential parts of the magneto-optical disc shown in FIG. 10.

The metal plate 105, formed as above, is arranged within the annular recess 106, as shown in FIG. 9, with the annular setting rim 111 set in the annular recess 106 of the disc base plate 102. The metal plate 102 is accommodated in the recess 106 of the disc base plate 102 by a supporting projection 112 formed by thermally deforming a part of the rim of the recess 106 of the disc base plate 102 ultrasonically or using a heating trowel as in the preceding embodiment. Since the recess 106 is of an inside diameter slightly larger than the outside diameter of the metal plate 105, a gap $D_4$ is present between the inner wall of the recess 106 and the outer periphery of the metal plate 105, as shown in FIG. 11. Besides, a gap $D_3$ is present between the surface of the supporting projection 112 facing the recess 106 and the rim 111 of the metal plate 105. The result is that the differential expansion and contraction between the metal plate 105 and the disc base plate 102 due to the difference in thermal expansion coefficients of these parts is absorbed by the gaps $D_3$, $D_4$ without producing distortion in the disc base plate 102 due to the inner stress otherwise caused by changes in the operating ambient temperatures of the magneto-optical disc.

Meanwhile, the metal plate in the first and the second embodiments is produced by punching or pressing a metal plate material, so that burrs tend to be produced on the rim of the metal plate in the punching direction. As a result thereof, the above-mentioned gaps between the metal plate and the recess of the disc base plate are diminished by these burrs of the metal plate so that there is the risk that the differential expansion or contraction caused between the metal plate and the disc base plate with changes in the operating ambient temperatures cannot be absorbed by these gaps. In such case, clearance means may be provided for clearing the burrs in the recess of the disc base plate.

Figure 12:
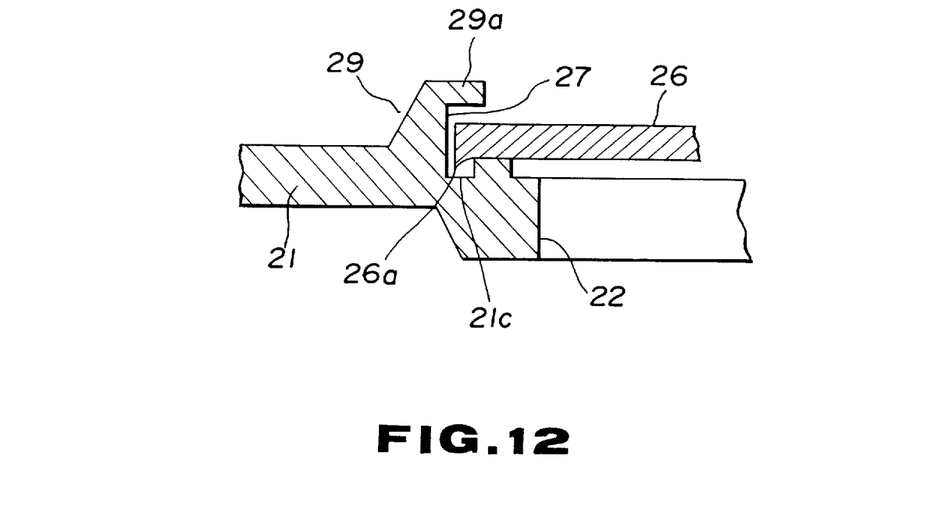
FIG. 12 is an enlarged cross-sectional view showing a modified embodiment of the disc according to the present invention.

An arrangement for clearing the burrs is shown in FIG. 12, in which the same parts or components as those of the preceding first embodiment are indicated by the same numerals and detailed description therefor is omitted for simplicity.

The metal plate 26 is produced by punching or pressing a metal plate material, so that a burr 26a is produced on the rim of the metal plate along the punching direction, as shown in FIG. 12.

An annular groove 21c for clearing the burr 26a of the metal plate 26 is formed on the bottom side outer periphery of the recess 27 of the disc base plate 21. The groove 21c is of a depth large enough to prevent the burr 26a of the metal plate 26 from being contacted with the bottom of the recess 27 of the disc base plate 21.

Thus, when the metal plate 26 is placed in the recess 22 of the disc base plate 21, the burr 26a of the metal plate 26 faces the groove 21c of the disc base plate 21, so that the metal plate 26 is not tilted within the recess 27 of the disc base plate 21 and a desired gap may be maintained between the metal plate 26 and the disc base plate 21.

Although the present invention has been explained in connection with the application thereof to a magneto-optical disc, the operation and result similar to those achieved with the magneto-optical disc may also be achieved with an optical disc in which a magnetic plate for magnetic attraction is provided on a disc base plate formed of synthetic resin.

What is claimed is:

1. An optical disc, comprising:

a disk-shaped substrate of unitary construction and having a first surface with a first opening therethrough, and a second surface substantially parallel to said first surface, said first surface being formed with a recess portion around the first opening and having a recording layer, said first opening having a first diameter and said recess portion having a second diameter larger than the first diameter, said second surface being formed with a first projection which is unitary with said second surface, said first projection having a second opening therethrough connected to said first opening, wherein a top surface of said first projection is parallel to said second surface and is dimensioned to be received by a means for rotationally driving the optical disc; and a plate-shaped magnetic member arranged in said recess portion, wherein a second projection is formed on said first surface around said recess portion and supports said magnetic member, said second projection is of unitary construction with the first surface, said second projection has a first portion and second portion of unitary construction with the first portion, said first portion is formed to project from said first surface, and said second portion is formed with the first portion, at a free end of said first portion and to hang over said recess portion and said magnetic member, so that said second portion retains the magnetic member in said recess portion.

2. An optical disc according to claim 1, wherein said second projection is L-shaped, with said first portion substantially perpendicular to said second portion.

3. An optical disc according to claim 1, wherein said recess portion has a larger diameter than does said magnetic member, and wherein said first opening has a smaller diameter than does the magnetic member.

4. An optical disc according to claim 3, wherein an inside surface of said second portion opposite to said magnetic member is separated by a gap from an outside surface of said magnetic member.

5. An optical disc according to claim 1, wherein said optical disc comprises a supporting portion supporting said magnetic member and formed in said recess portion, said supporting portion projecting from a bottom of said recess portion.

6. An optical disc according to claim 1, wherein said magnetic member is a unitary member which comprises an outer peripheral portion, an upstanding wall portion and a top surface portion, said outer peripheral portion and said top surface portion having surfaces parallel to each other, said outer peripheral portion and said top surface portion are connected together by said upstanding wall portion, and said outer peripheral portion, said upstanding wall portion, and said top surface portion are unified.

7. An optical disc comprising:

a disk-shaped substrate of unitary construction and having a first surface with a first opening therethrough, and a second surface substantially parallel to said first surface, said first surface being formed with a recess portion around the first opening and having a recording layer, said first opening having a first diameter and said recess portion having a second diameter larger than the first diameter, said second surface being formed with a first projection which is unitary with said second surface, said first projection having a second opening therethrough connected to said first opening, wherein a top surface of said first projection is parallel to said second surface and is dimensioned to be received by a means for rotationally driving the optical disc; and a plate-shaped magnetic member arranged in said recess portion, wherein a second projection of unitary construction with the substrate projects from an inner side wall of said recess portion to hang over said recess portion, to retain the magnetic member in said recess portion.

8. An optical disc according to claim 7, wherein said magnetic member is a unitary member which comprises an outer peripheral portion, an upstanding wall portion and a top surface portion, said outer peripheral portion and said top surface portion having surfaces parallel to each other, said outer peripheral portion and said top surface portion are connected together by said upstanding wall portion, and said outer peripheral portion, said upstanding wall portion, and said top surface portion are unified.

9. An optical disc according to claim 8, wherein said optical disc comprises a further recess portion formed on said second projection.

10. An optical disc according to claim 9, wherein an inside surface of said second portion opposite to said magnetic member is separated by a gap from an outside surface of said magnetic member.

11. An optical disc according to claim 10, wherein said recess has a larger diameter than does said magnetic member, and wherein said first opening has a smaller diameter than does the magnetic member.

* * * * *